(12) United States Patent
Lee

(10) Patent No.: US 8,571,473 B2
(45) Date of Patent: Oct. 29, 2013

(54) WIRELESS SUBSCRIBER STATION FOR SHORT RANGE AD-HOC DATA COMMUNICATION

(75) Inventor: Chun Woo Lee, San Ramon, CA (US)

(73) Assignee: Qualcomm Incorporated, San Diego, CA (US)

(*) Notice: Subject to any disclaimer, the term of this patent is extended or adjusted under 35 U.S.C. 154(b) by 953 days.

(21) Appl. No.: 11/807,638

(22) Filed: May 29, 2007

(65) Prior Publication Data
US 2007/0281720 A1     Dec. 6, 2007

Related U.S. Application Data

(60) Provisional application No. 60/810,330, filed on Jun. 2, 2006.

(51) Int. Cl.
    *H04B 7/00*     (2006.01)
(52) U.S. Cl.
    USPC .......................................... 455/41.2; 370/338
(58) Field of Classification Search
    USPC .................. 455/41.2, 41.1, 41.3, 448, 552.1; 370/338, 401, 406, 395.5
    See application file for complete search history.

(56) References Cited

U.S. PATENT DOCUMENTS

| | | | |
|---|---|---|---|
| 7,809,386 B2 * | 10/2010 | Stirbu | ........................... 370/328 |
| 2003/0083095 A1 | 5/2003 | Liang | |
| 2003/0235175 A1 | 12/2003 | Naghian et al. | |
| 2004/0092265 A1 | 5/2004 | Chitrapu et al. | |
| 2004/0127214 A1 | 7/2004 | Reddy et al. | |
| 2005/0036470 A1 | 2/2005 | Calvert | |
| 2005/0198233 A1 | 9/2005 | Manchester et al. | |
| 2005/0243758 A1 | 11/2005 | Torarp et al. | |
| 2005/0255878 A1 * | 11/2005 | Leinonen et al. | .......... 455/552.1 |
| 2005/0282494 A1 | 12/2005 | Kossi et al. | |
| 2007/0076649 A1 * | 4/2007 | Lin et al. | ....................... 370/328 |

FOREIGN PATENT DOCUMENTS

| | | | |
|---|---|---|---|
| CN | 1638345 A | | 7/2005 |
| CN | 1781282 A | | 5/2006 |
| JP | 62021331 A | | 1/1987 |
| JP | 2084832 A | | 3/1990 |
| JP | 4145733 A | | 5/1992 |
| JP | 2000023260 A | | 1/2000 |
| JP | 2000278280 A | | 10/2000 |
| JP | 2004135778 A | | 5/2004 |
| RU | 2207724 | | 6/2003 |
| WO | 0162026 A1 | | 8/2001 |
| WO | WO2004098126 A1 | | 11/2004 |
| WO | WO2005034434 A1 | | 4/2005 |

OTHER PUBLICATIONS 802.16 IEEE Standard for Local and Metropolitan Area Networks Part 16: Air Interface for Fixed Broadband Wireless Access Systems, Abstract, p. 48, 138,462.*
International Search Report and Written Opinion of the International Searching Authority Dated Jan. 3, 2008, International Application No. PCT/US2007/12840.
802.16 IEEE Standard for Local and Metropolitan area networks Part 16: Air Interface for Fixed Broadband Wireless Access Systems, Abstract, p. 48, 138, 462.
K.Y. Eng, et al., A Wireless Broadband Ad-Hoc ATM Local-Area Network, Wireless Networks 1, p. 161-174, 1995.
Supplementary European Search Report—EP07795544—Search Authority—The Munich—Feb. 18, 2013.
Taiwan Search Report—TW096119752—TIPO—May 24, 2013.

* cited by examiner

*Primary Examiner* — Nay A Maung
*Assistant Examiner* — Angelica M Perez
(74) *Attorney, Agent, or Firm* — Charles Chesney

(57) ABSTRACT

An embodiment of the present invention is a technique for short-range ad-hoc mode communication. An ad-hoc mode is configured for a first mobile station (MS) operating in an ad-hoc network under a broadband wireless standard. An ad-hoc mode communication is acquired having a simplified communication protocol of the broadband wireless standard. A second MS is communicated with using the ad-hoc mode communication.

27 Claims, 9 Drawing Sheets

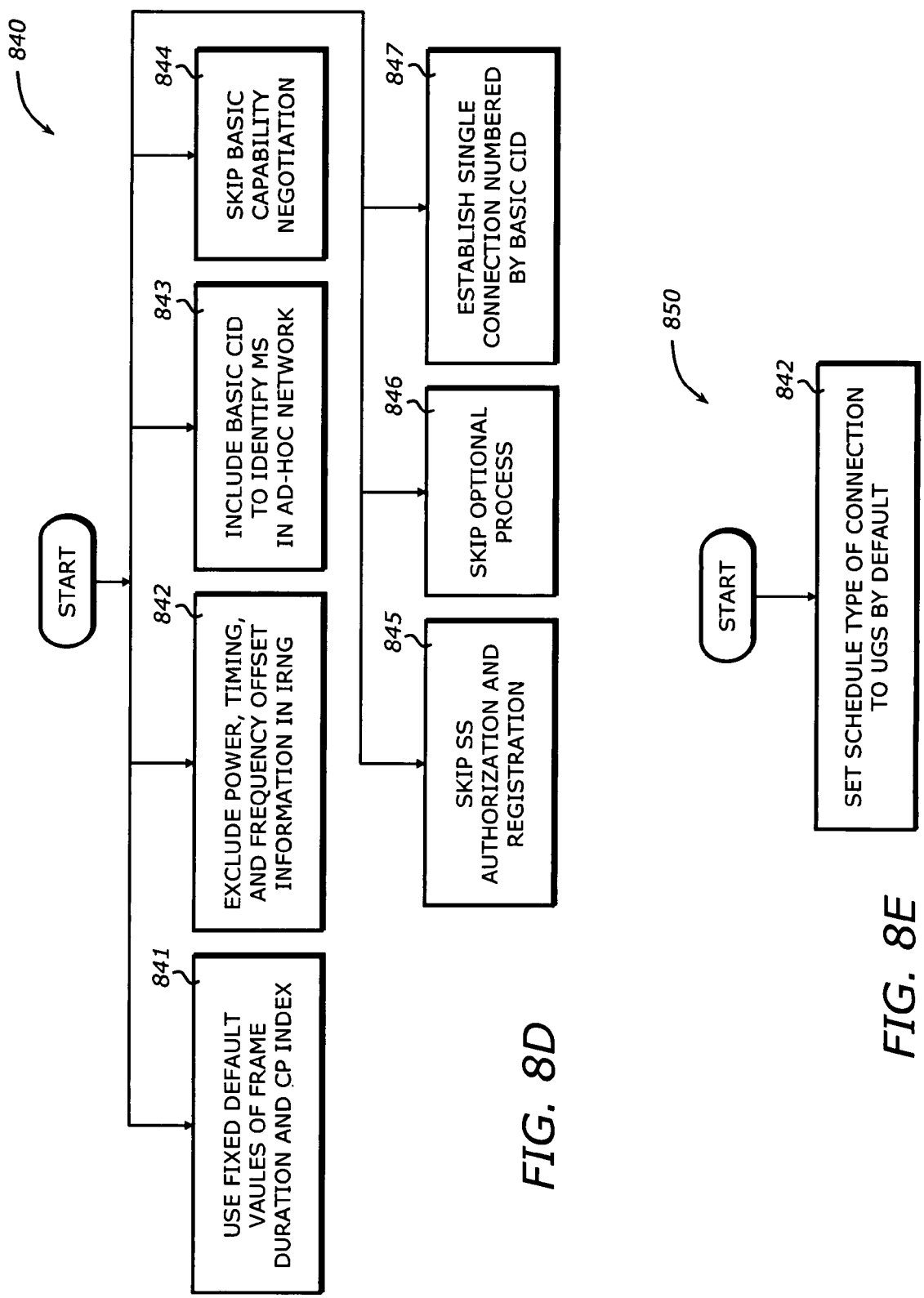

WIRELESS SUBSCRIBER STATION FOR SHORT RANGE AD-HOC DATA COMMUNICATION

RELATED APPLICATION

This application claims the benefit of the provisional application, titled "IEEE 802.16 based wireless subscriber station for short range ad-hoc data communication", filed Jun. 2, 2006, Ser. No. 60/810,330.

BACKGROUND

1. Field of the Invention

Embodiments of the invention relate generally to wireless communication systems. More particularly, the embodiments of the invention relate to wireless ad-hoc data communication.

2. Description of Related Art

The Institute of Electronics and Electrical Engineers (IEEE) 802.16 standards describe air interfaces for fixed and mobile broadband wireless access systems, especially for Metropolitan Area Network (MAN) or Wide Area Network (WAN). There are different standards for wireless Personal Area Network (PAN) and wireless Local Area Network (LAN) such as IEEE 802.11, known as Wireless Fidelity (Wi-Fi), and IEEE 802.15, known as Bluetooth to the public. Both Bluetooth and Wi-Fi include ad-hoc network protocol so that a user terminal can connect to the other user terminal directly without an access point. The IEEE 802.16 subscriber station (SS) may communicate directly between the SSs using the mesh mode. However, the protocol is so complex that industrial standards such as Worldwide Interoperability for Microwave Access (WiMAX) and Wireless Broadband (WiBro) have not adopted the mesh mode.

Both Bluetooth and Wi-Fi equipment generally cannot communicate if a SS is away more than a short distance (e.g., 300 feet) from the access point. The IEEE 802.16 protocol is designed to cover tens of miles. Therefore, IEEE 802.16 equipment may be substituted for the Bluetooth and Wi-Fi equipment theoretically but not vice versa.

BRIEF DESCRIPTION OF THE DRAWINGS

Embodiments of invention may best be understood by referring to the following description and accompanying drawings that are used to illustrate embodiments of the invention. In the drawings:

FIG. 8D is a flowchart illustrating a process to simplify network entry according to one embodiment of the invention.

FIG. 8E is a flowchart illustrating a process to simplify bandwidth allocation and scheduling according to one embodiment of the invention.

DESCRIPTION

An embodiment of the present invention is a technique for short-range ad-hoc mode communication. An ad-hoc mode is configured for a first mobile station (MS) operating in an ad-hoc network under a broadband wireless standard. An ad-hoc mode communication is acquired having a simplified communication protocol of the broadband wireless standard. A second MS is communicated with using the ad-hoc mode communication.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention include a technique to provide an ad-hoc mode communication for mobile stations in an ad-hoc network using a broadband wireless standard. The ad-hoc network includes fixed or mobile subscriber stations (SSs) which are closely located to each other. The short range ad-hoc network does not have a base station (BS). Instead, it has a server mobile station (SMS). The SMS opens a wireless channel including continuous fixed time duration frames. These frames are started with long pre-ambles followed by frame control headers (FCHs). Each of the FCHs contains a mark or identifier to represent the ad-hoc network so that the neighboring SSs may distinguish the ad-hoc network from the infrastructure network formed by a BS.

The SMS in the ad-hoc network may be significantly simplified compared to the BS by performing the ad-hoc mode communication using a simplified communication protocol of the broadband wireless standard. By following a simplified communication protocol, the SMS may be designed with much less complexity than the BS, resulting in lower device costs and development time and human resources. The broadband wireless standard may be the IEEE 802.16. The SMS or the MSes in the ad-hoc network may also be compatible with WiMAX and/or WiBro specifications.

The simplified communication protocol may include simplifications of the initial ranging and periodic ranging, the downlink broadcast management messages, the network entry procedures, and the bandwidth allocation and scheduling.

Figure 1:
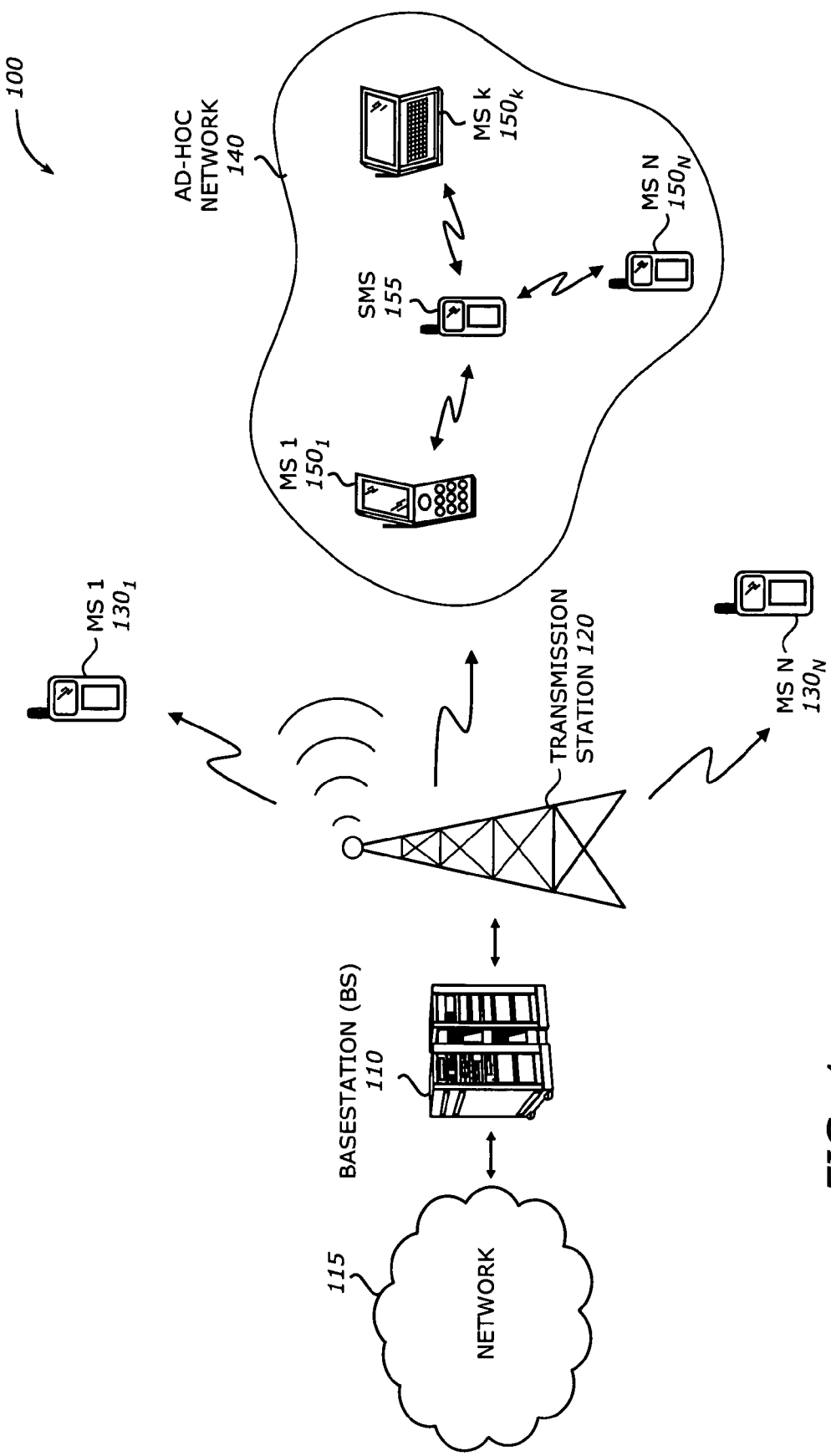
FIG. 1 is a diagram illustrating a system according to an embodiment of the invention.

FIG. 1 is a diagram illustrating a system 100 according to an embodiment of the invention. The system 100 includes a base station 110, a network 115, N mobile stations 130₁ to 130_N, and an ad-hoc network 140.

The base station (BS) 110 is a radio frequency (RF) receiver and transmitter unit or system that serves as the hub of the network communication. It receives and transmits RF signals through the transmission station 120 which may include a high powered antenna. It may have a wired or wireless connection to the network 115. The network 115 may be any network such as the Internet, intranet, LAN, WAN, PAN, etc.

The N mobile stations $130_1$ to $130_N$ may be any mobile devices that have wireless connectivity such as cellular phones, personal digital assistants (PDAs), notebook computers, laptop computers, hand-held computers, etc. When a mobile station $130_j$ is registered to the BS 110, it may be connected to the network 115. The BS 110 may allocate wireless resources such as time and frequency so that the BS may transmit downlink (DL) data and the MSes may transmit uplink (UL) data without collision.

The ad-hoc network 140 is a network that does not require any infrastructure to provide communication services. The ad-hoc network 140 includes N mobile stations (MS) $150_1$ to $150_N$. The N mobile stations $150_1$ to $150_N$ may typically be located within a short distance. As soon as they come close to each other, they detect each other and start organizing themselves. The ad-hoc network 140 includes a serving MS (SMS) 155 that may exchange data packets with any one of the N mobile stations $150_1$ to $150_N$. The SMS may also have a bridging function so that the N mobile stations $150_1$ to $150_N$ may communicate with one another through the SMS 155. The SMS 155 may be a MS that is set manually or automatically to act as the SMS in the ad-hoc network 140.

All the MSes in the ad-hoc network 140 may operate under a broadband wireless standard. In one embodiment, the broadband wireless standard is the IEEE 802.16 standard. All the MSes in the ad-hoc network 140 may also have all the mandatory functions described in the WiMAX and/or Mobile WiMAX and/or WiBro specifications. Any one of the MSes in the ad-hoc network 140 may become an SMS. By employing the simplified communication protocol of the broadband wireless standard (e.g., the IEEE 802.16), the MSes, including the SMS, involving in the ad-hoc communication may have simplified design and complexity, resulting in low cost, high reliability, efficient communication, and convenience to the user or users.

Figure 2:
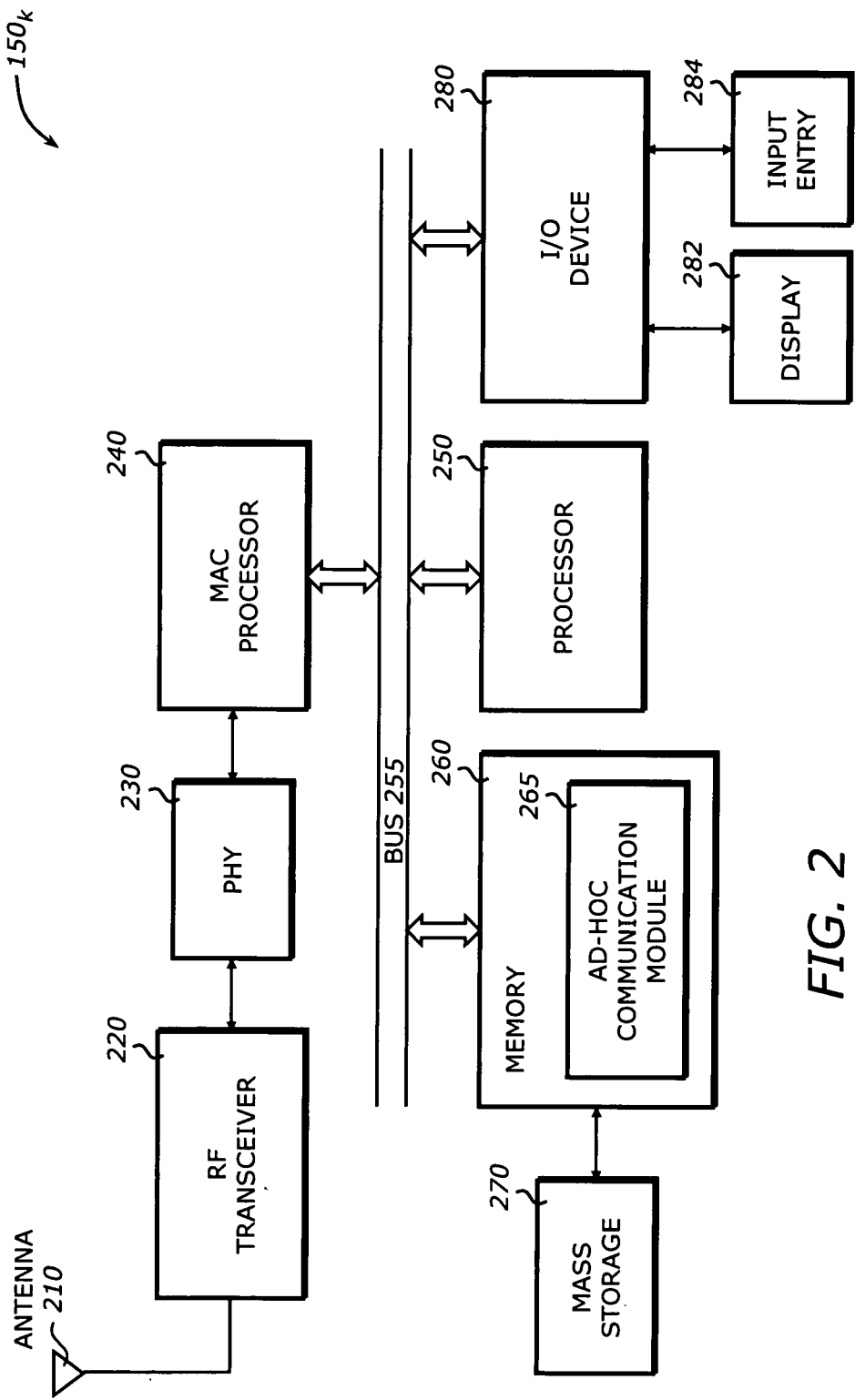
FIG. 2 is a diagram illustrating a mobile station according to one embodiment of the invention.

FIG. 2 is a diagram illustrating the mobile station $150_j/155$ shown in FIG. 1 according to one embodiment of the invention. The MS $150_j/155$ includes an antenna 210, an RF transceiver 220, a physical layer (PHY) 230, a medium access control (MAC) processor 240, a processor 250, a memory 260, a mass storage device 270, and an input/output (I/O) device 280. It is noted that the mobile station $150_j/155$ may include more or less than the above components. The mobile station $150_j/155$ may represent any of the MSes, including the SMS, in the ad-hoc network 140.

The antenna 210 is an antenna designed for wireless mobile device. It may operate in a frequency range suitable for the wireless communication in the ad-hoc network 140. It may have non-direct line of sight (NDLOS). In one embodiment, the frequency range may be from 2.5 GHz to 3.5 GHz and compatible with IEEE 802.16 and 802.20 standards. The RF transceiver 220 is a unit that includes receiver and transmitter functionalities such as filters, modulator, demodulator, etc. to convert digital data to analog base-band signal and then to RF signal and to convert RF signal to analog base-band signal and then to digital data.

The PHY 230 performs physical layer signal processing functions. In one embodiment, the signal processing functions are based on the Orthogonal Frequency Division Multiplexing (OFDM) technology used in the IEEE 802.16 standard. These functions may include channel coding, inverse Fast Fourier Transform (IFFT) for the transmitter path, and synchronization, Fast Fourier Transform (FFT), equalization, and channel decoding for the receiver path. It may be a specialized processor, an Application Specific Integrated Circuit (ASIC), a programmable field gate array (FPGA), a digital signal processor (DSP), or any other device that may perform the required physical layer signal processing functions.

The MAC processor 240 performs the MAC functions such as network entry, DL synchronization, initial ranging, registration, IP connectivity, protocol data unit (PDU) creation, scheduling, etc. It may be a programmable DSP, an ASIC, or any other suitable processor.

The processor 250 may be a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 260 stores system code and data. The memory 260 is typically implemented with dynamic random access memory (DRAM), static random access memory (SRAM), or any other types of memories including those that do not need to be refreshed. The memory 260 may include multiple channels of memory devices such as DRAMs. The memory 260 may include an ad-hoc communication module 265. The ad-hoc communication module 265 includes program instructions and data to perform ad-hoc communication for the ad-hoc network 140 (FIG. 1). It is noted that the functions of the ad-hoc communication module 265 may be performed by the MAC processor 240 in whole or in part. An ad-hoc communication processing unit therefore may include any one of the ad-hoc communication module 265, the MAC processor 240, a combination of the ad-hoc communication module 265 and the MAC processor 240 a dedicated processor, a specially programmed processor, or any processing unit that may perform the ad-hoc communication operations described below. In addition, the ad-hoc communication processing unit may be implemented in whole or in part by hardware, software/firmware, or any combination of hardware, software, and firmware.

The interconnect or bus 255 provides interface to peripheral devices. The interconnect 255 may be point-to-point or connected to multiple devices. For clarity, not all interconnects are shown. It is contemplated that the interconnect 255 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage device 270 may store archive information such as code, programs, files, data, and applications. The mass storage device may include flash semiconductor memories, compact disk (CD) read-only memory (ROM), digital versatile disc (DVD), any other magnetic or optic storage devices. The mass storage device provides a mechanism to read machine-accessible media.

The I/O device 280 may include any I/O device to perform I/O functions. The I/O device may interface with a display 282 and an input entry device 284 (e.g., keyboard, mouse) for user interface.

Figure 3:
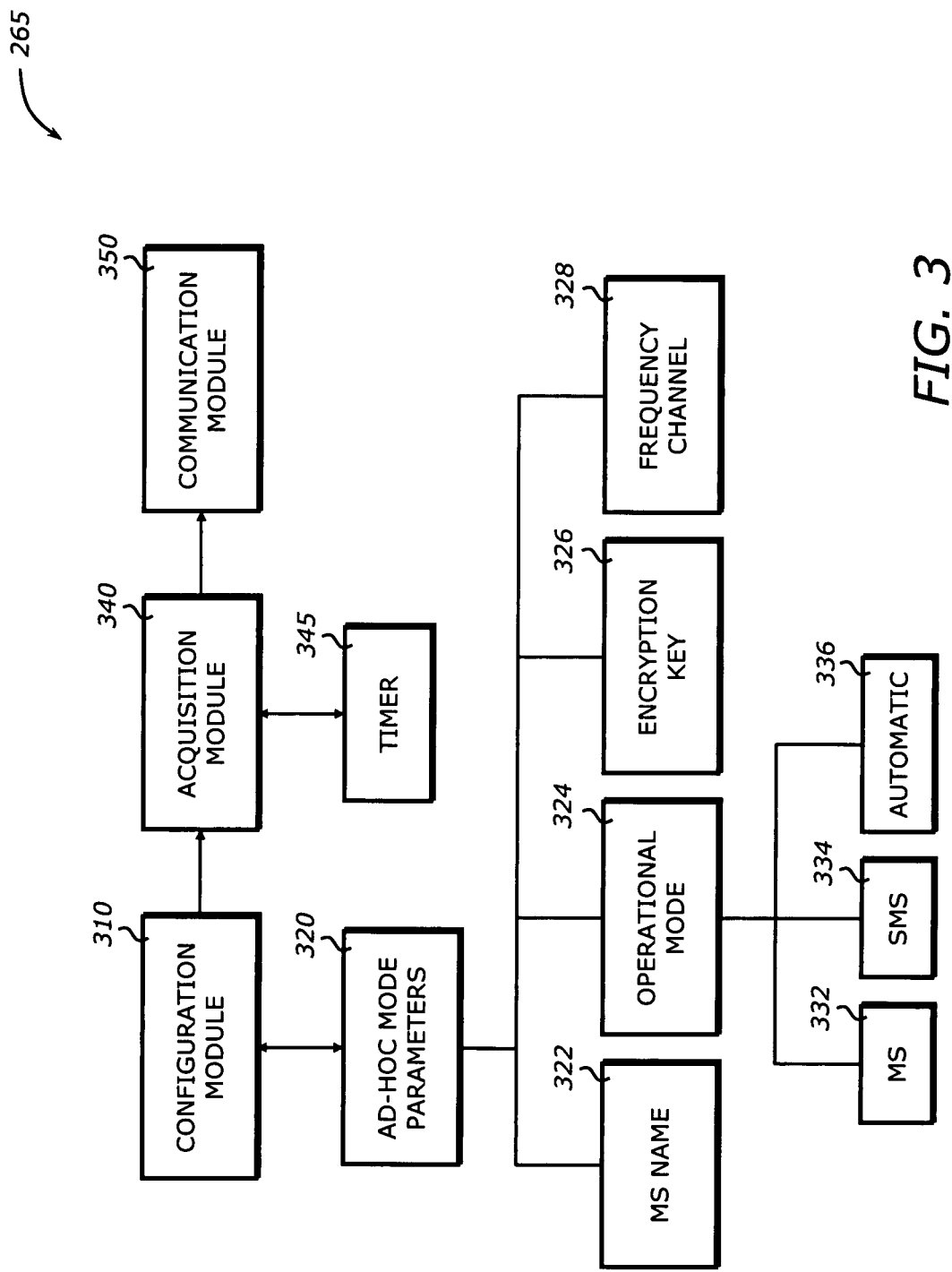
FIG. 3 is a diagram illustrating an ad-hoc communication module according to one embodiment of the invention.

FIG. 3 is a diagram illustrating an ad-hoc communication module 265 according to one embodiment of the invention. The ad-hoc communication module 265 includes a configuration module 310, an acquisition module 340, and a communication module 350. It is noted that the ad-hoc communication module 265 may include more or less than the above components. Furthermore, any of the above components may be implemented by a hardware circuit, a software/firmware module, or any combination of hardware, software, and firmware.

The configuration module 310 configures an ad-hoc mode for a first mobile station (MS) operating in an ad-hoc network under a broadband wireless standard. In one embodiment the broadband wireless standard is the IEEE 802.16. The configuration module 310 configures ad-hoc mode parameters 320. These parameters include an MS name 322, an operational mode 324, encryptions keys 326, and frequency channels 328. The operational mode 324 includes an MS mode 332, and SMS mode 334, and an automatic mode 336. The MS name 322 may be used as the name of the MS unit and may be displayed by the SMS in the ad-hoc network 140.

The acquisition module 340 acquires an ad-hoc mode communication having a simplified communication protocol of the broadband wireless standard. The acquisition module 340 searches for an SMS during the initial phase of the ad-hoc communication. The acquisition module 340 may use a timer 345 to set a search period. The timer 345 may be initialized by a pre-determined time interval. When the timer times out, it indicates that the search period is completed. The timer 345 may then be re-initialized for the next search period if desired.

The communication module 350 communicates with at least another MS using the ad-hoc mode communication. The communication module 350 uses the simplified communication protocol by perform a number of operations, actions, or tasks that simplify the communication protocol of the wireless standard (e.g., the IEEE 802.16).

Figure 4:
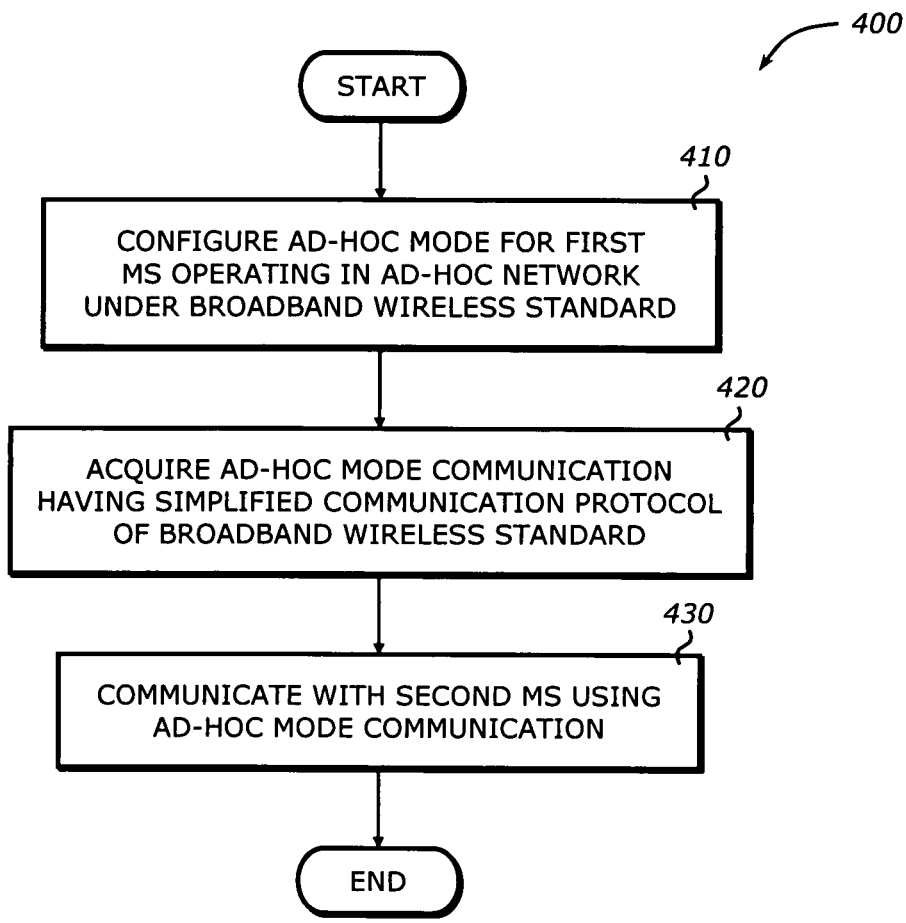
FIG. 4 is a flowchart illustrating a process to perform ad-hoc communication according to one embodiment of the invention.

FIG. 4 is a flowchart illustrating a process 400 to perform ad-hoc communication according to one embodiment of the invention. The process 400 may be performed by any one of the MSes in the ad-hoc network 140 (FIG. 1).

Upon START, the process 400 configures an ad-hoc mode for a first mobile station (MS) operating in an ad-hoc network under a broadband wireless standard (Block 410). The first MS may be the MS that executes the process 400. Then, the process 400 acquires an ad-hoc mode communication having a simplified communication protocol of the broadband wireless standard (Block 420). Next, the process 400 communicates with a second MS using the ad-hoc mode communication (Block 430). The process 400 is then terminated.

Figure 5:
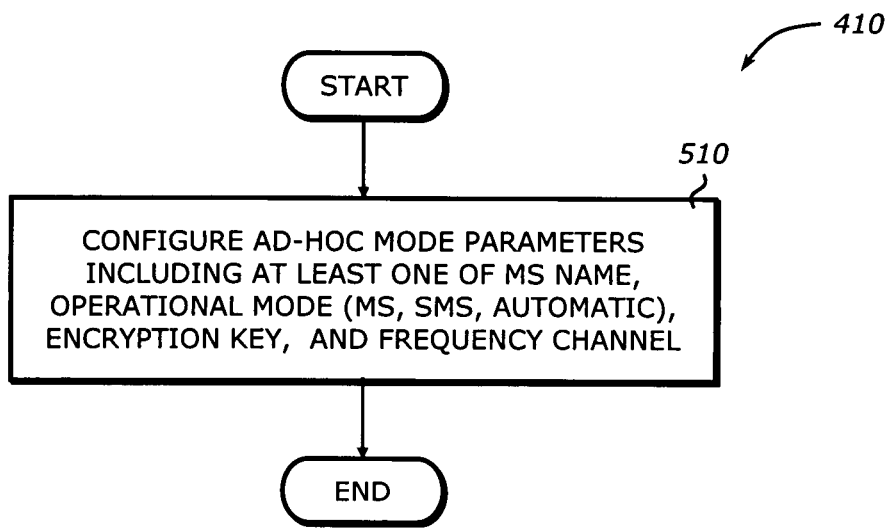
FIG. 5 is a flowchart illustrating a process to configure an ad-hoc mode according to one embodiment of the invention.

FIG. 5 is a flowchart illustrating the process 410 shown in FIG. 4 to configure an ad-hoc mode according to one embodiment of the invention.

Upon START, the process 410 configures ad-hoc mode parameters (Block 510). The ad-hoc mode parameters include parameters that may be used for ad-hoc communication. These parameters may include a MS name, an operational mode, encryption keys, and frequency channels. The MS name is a user friendly name assigned to the MS unit and may be used by the SMS in the ad-hoc network 140 to display to the user. The operational mode may be a manual mode or automatic mode. The manual mode allows the user to set the mode of the MS to be an MS or an SMS in the ad-hoc network.

The automatic mode automatically searches for an SMS first. When there is no SMS found during a search period, the device sets itself to be the SMS. When there is at least an SMS found during the search period, the device allows the user to select the SMS. The process 510 is then terminated.

Figure 6:
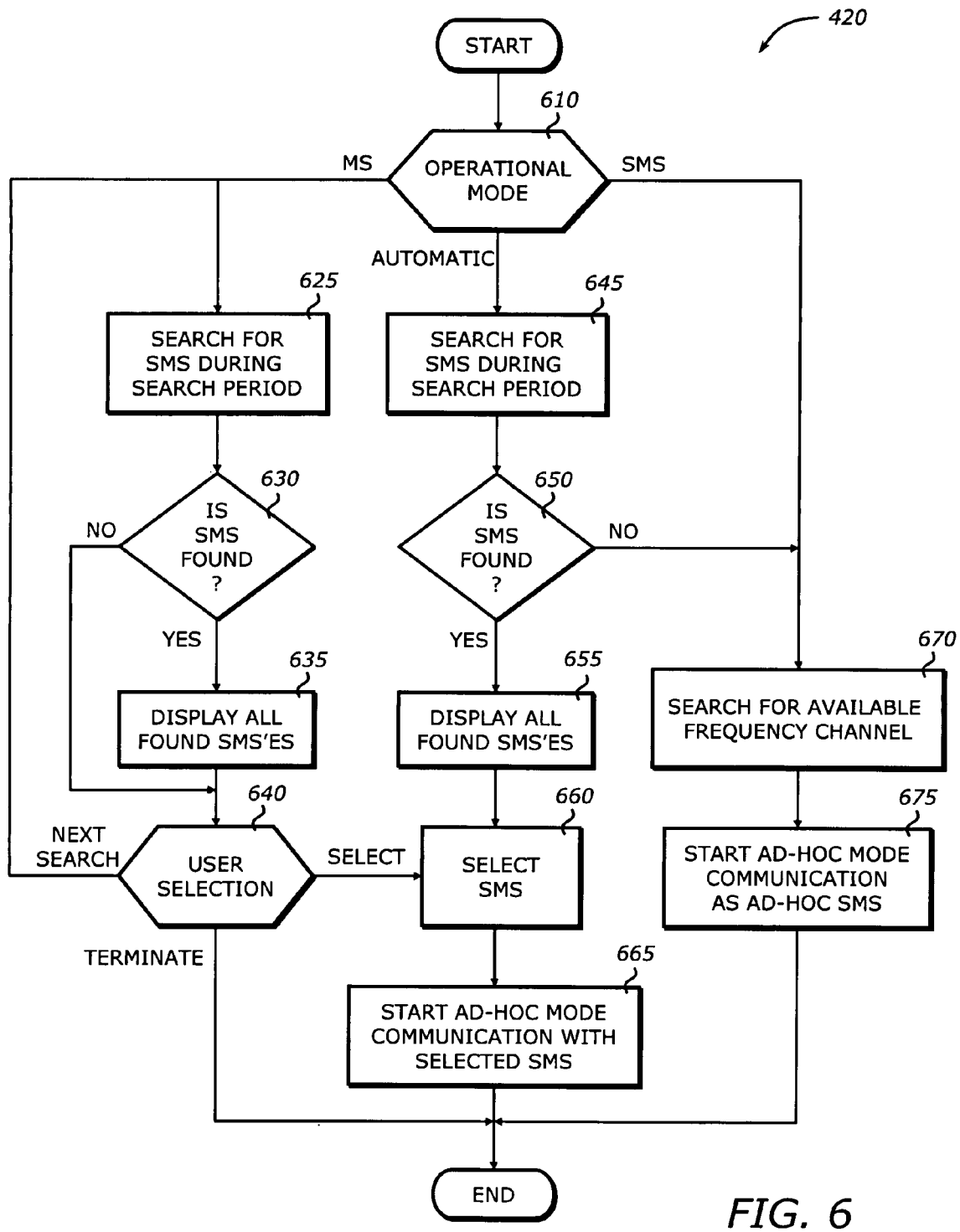
FIG. 6 is a flowchart illustrating a process to acquire an ad-hoc mode communication according to one embodiment of the invention.

FIG. 6 is a flowchart illustrating the process 420 shown in FIG. 4 to acquire an ad-hoc mode communication according to one embodiment of the invention.

Upon START, the process 420 determines the operational mode (Block 610). The operational mode may be any one of a manual mode and an automatic mode. The manual mode is the mode in which the operation mode is set manually either by the user or by default. The operational mode may be a MS mode, a SMS mode, or an automatic mode.

If the operational mode is MS, the process 420 searches for one or more SMSes during a search period (Block 625). The search period may be set by default. Next, the process 420 determines if there are any SMS found (Block 630). If so, the process 420 displays all the found SMSes on the display to allow the user to select (Block 635). Otherwise, the process 420 goes to Block 640. At Block 640, the process 420 determines the user selection. If the user selects next search, the process 420 returns to Block 625 to continue searching for another SMS. If the user selects terminate, the process 420 is terminated. If the user selects an SMS, the process 420 goes to Block 660.

If the operational mode is SMS, the process 420 searches for an available or empty frequency channel (Block 670). Then, the process 420 starts ad-hoc mode communication as an ad-hoc SMS (Block 675) and is then terminated.

If the operational mode is automatic, the process 420 searches for an SMS during a search period (Block 645). The search period may be set by a timer. Next, the process 420 determines if an SMS is found during the search period (Block 650). If not, the process 420 goes to Block 670. Otherwise, the process 420 displays all the found SMSes for user selection (Block 655). Next, the process 420 allows the user to select an SMS (Block 660). Then, the process 420 starts an ad-hoc mode communication with the selected SMS (Block 665). The process 420 is then terminated.

Figure 7:
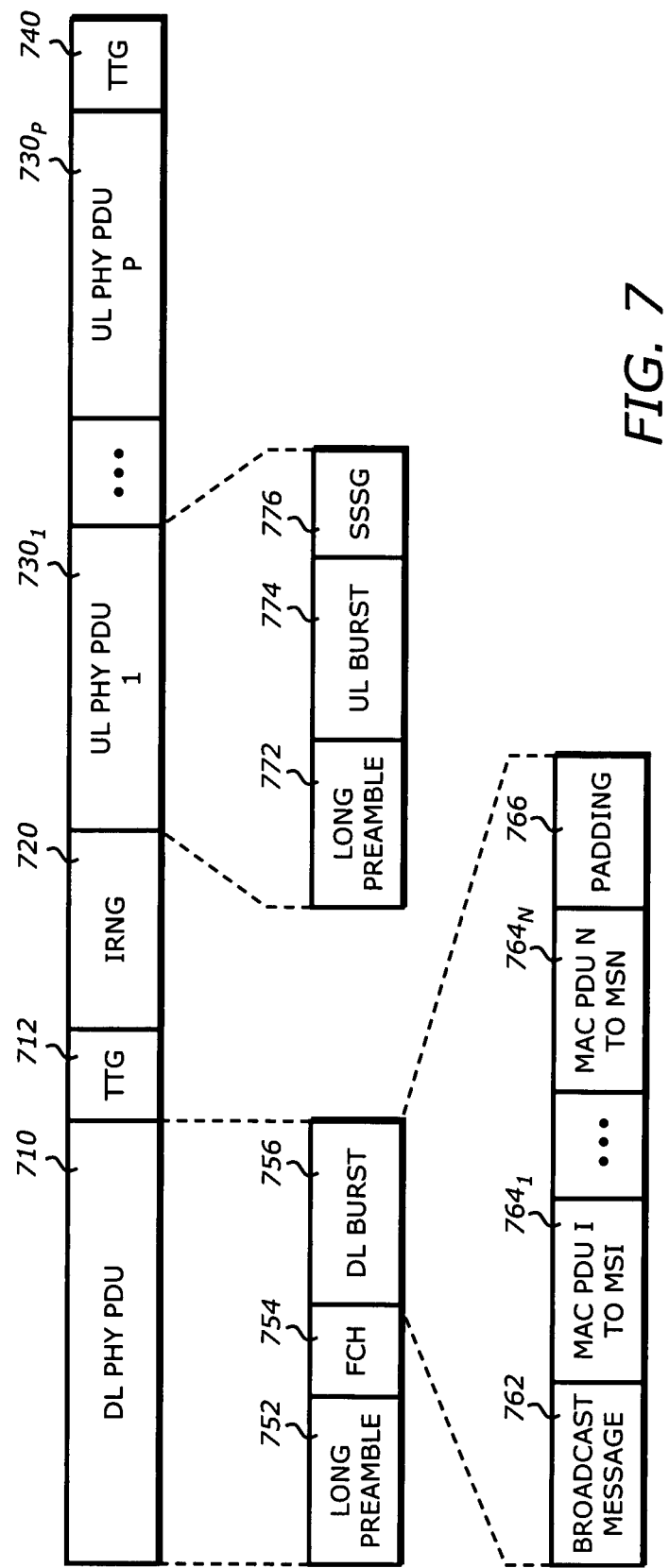
FIG. 7 is a diagram illustrating a simplified frame structure according to one embodiment of the invention.

FIG. 7 is a diagram illustrating a simplified frame structure 700 according to one embodiment of the invention. The simplified frame structure 700 includes a DL PHY PDU 710, a transmit/receive transition gap (TTG) 715, an initial ranging interval IRNG 720, P UL PHY PDU messages $730_1$ to $730_P$, and an receiver/transmit transition gap (RTG) 740.

The DL PHY PDU message 710 includes a pre-amble 752, a frame control header (FCH) 754, and a DL burst 756. The FCH 754 may be used to describe the DL burst 756 and the number of MSes in the ad-hoc network 140. This information is used to calculate the time offset as described later. The FCH 754 may also be used to store the modulation type of each UL burst in place of the UCD message so that the UCD message may be omitted. The FCH 754 may also be used to store the modulation type of the DL burst so that the DCD message may be omitted. The DL burst 756 includes a broadcast message 762, N MAC PDU 1 to MAC PDU N $764_1$ to $764_N$, and a padding 766. The DL burst 756 packs all the DL MAC PDU messages. These message fields may be simplified for the ad-hoc mode communication as described later.

The UL PHY PDU $730_j$ includes a pre-amble 772, an UL burst 774, and an SS separation gap (SSSG) 776. The ranging process may be omitted by allocating the UL burst interval for the UL PHY PDU $730_j$ long enough to eliminate the propagation delay effect which may cause collision between the UL PHY PDU messages, each sent by a different MS. The SMS PHY may synchronize the UL PHY PDUs even though they do not arrive at the exact boundary of each scheduled UL burst start time by pre-pending the pre-amble 772 on the UL PHY PDU 730$_j$. The pre-amble 772 is sufficiently long for the SMS to detect timing, frequency, power offset, etc., which is also needed for ranging process omission.

Figure 8A:
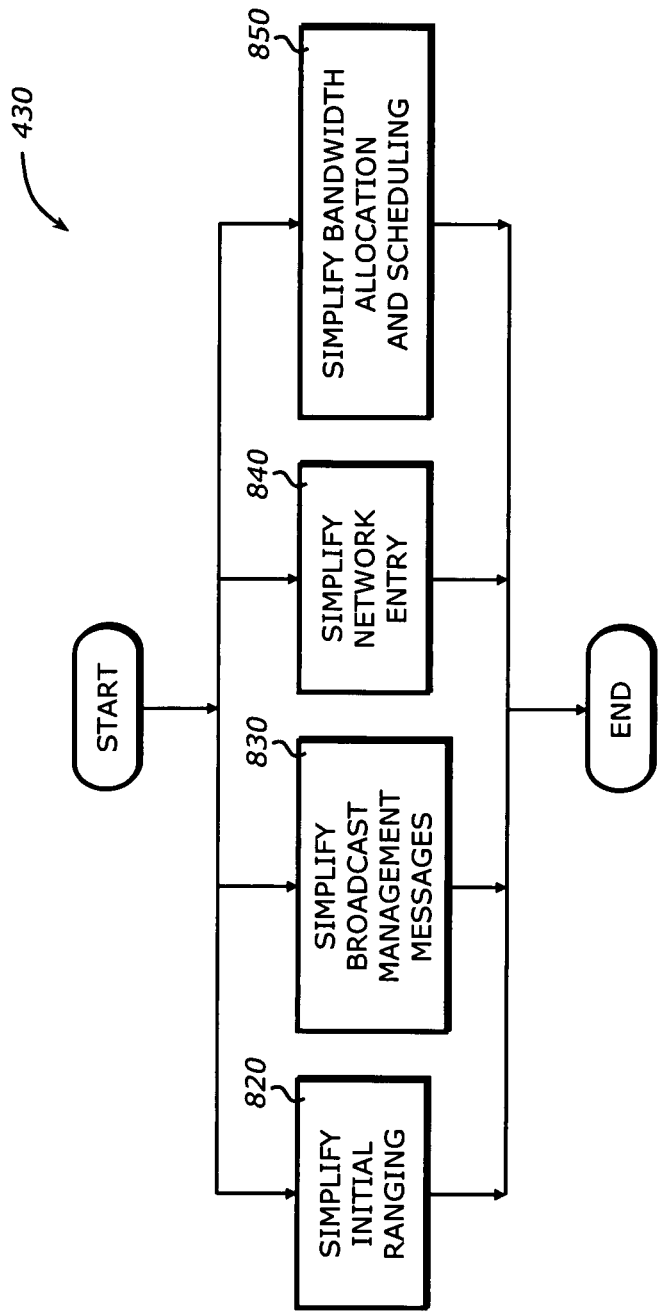
FIG. 8A is a flowchart illustrating a process to communicate with another MS according to one embodiment of the invention.

FIG. 8A is a flowchart illustrating the process 430 shown in FIG. 4 to communicate with another MS according to one embodiment of the invention.

Upon START, the process 430 may perform at least one of several simplification tasks in blocks 820, 830, 840, or 850. These simplification tasks provide a simplified communication protocol of the broadband wireless standard (e.g., IEEE 802.16) employed by the MSes in the ad-hoc network 140. The process 430 may simplify initial ranging (Block 820), broadcast management messages (Block 830), network entry (840), or bandwidth allocation and scheduling (Block 850). The process 430 is then terminated.

Figure 8B:
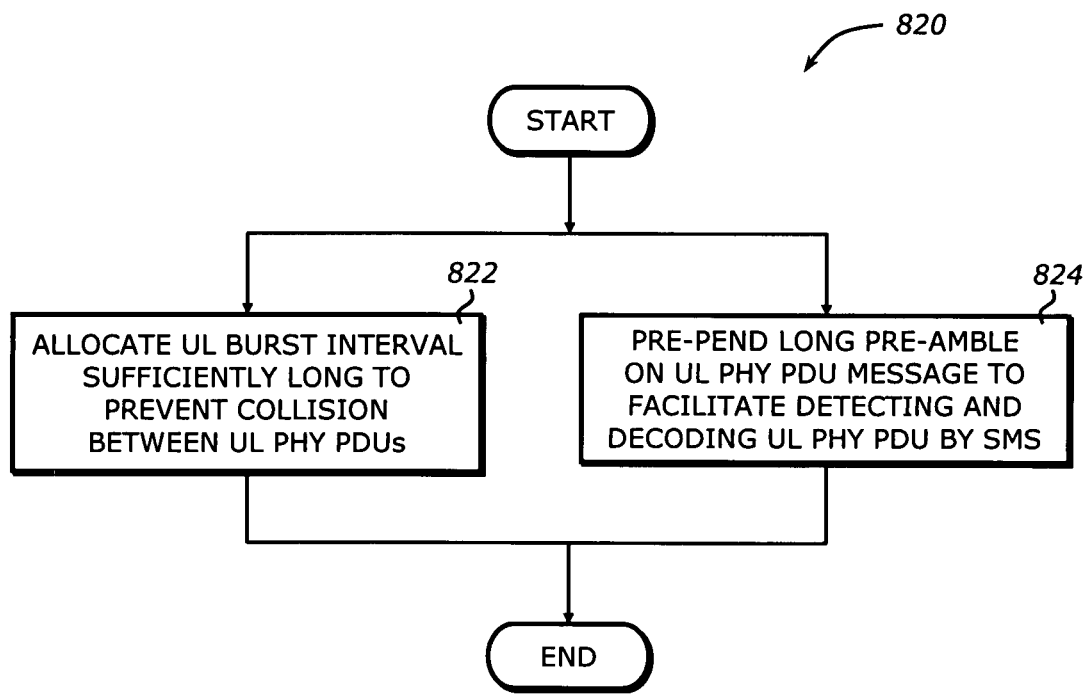
FIG. 8B is a flowchart illustrating a process to simplify ranging according to one embodiment of the invention.

FIG. 8B is a flowchart illustrating the process 820 shown in FIG. 8A to simplify ranging according to one embodiment of the invention.

Upon START, the process 820 may perform at least one of the operations or actions in blocks 822 and 824. The process 820 may allocate the UL burst interval sufficiently long to prevent collision between the UL PHY PDUs, each of which is transmitted from a different MS (Block 822). The process 820 may pre-pend a long preamble on an UL PHY PDU message to facilitate detecting and decoding the UL PHY PDU by an SMS (Block 824). The process 820 is then terminated.

Figure 8C:
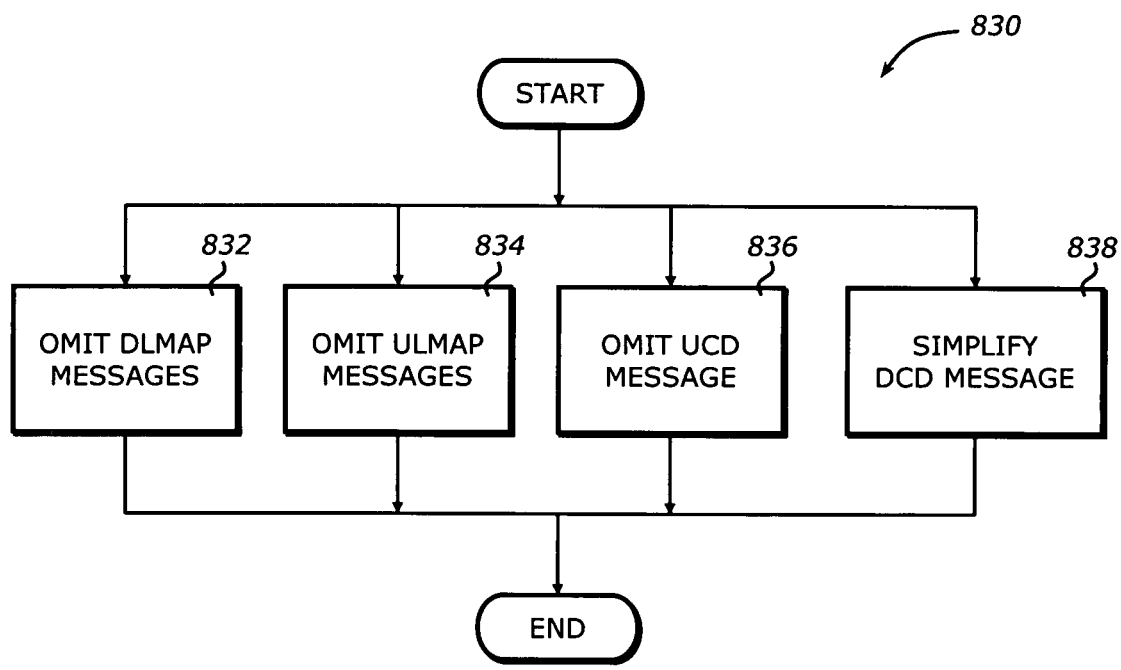
FIG. 8C is a flowchart illustrating a process to simplify broadcast management messages according to one embodiment of the invention.

FIG. 8C is a flowchart illustrating the process 830 shown in FIG. 8A to simplify broadcast management messages according to one embodiment of the invention. The IEEE 802.16 standards introduce DL Medium Access Protocol (DL MAP), UL MAP, Downlink Channel Descriptor (DCD) and Uplink Channel Descriptor (UCD) messages. The DL MAP includes encoding information of DL bursts and the UL MAP includes encoding information of UL bursts. The DCD and UCD include downlink and uplink, respectively, channel information. Transmitting those broadcast management messages is a BS's own functionality which may not be needed in the ad-hoc mode communication and may be simplified or omitted.

Upon START, the process 830 may perform at least one of the operations or actions in blocks 832, 834, 836, and 838. The process 830 may omit DL MAP messages by packing all DL MAC PDU messages into a single DL burst (Block 832). This is shown in FIG. 7. The single DL burst 756 (FIG. 7) includes the broadcast message 762 and uni-cast messages for the MSes in the ad-hoc network 140 (FIG. 1).

The process 830 may omit UL MAP messages by calculating time offset of an UL burst using number of MSes in the ad-hoc network and a basic CID (Block 834). The UL MAP specifies offsets and lengths of each UL burst as well as UL start time which tells the boundary of downlink and uplink. The UL start time information is not needed if it does not change frame by frame and is known to every station in the ad-hoc network 140. The SMS and all MSes running on the ad-hoc mode may have fixed default value of UL start time, TTG 715, IRNG 720, and RTG 740 as shown in FIG. 7. A MS may calculate the time offset of the UL burst which is allocated for itself using the following parameters: (1) number of MSes in the ad-hoc network 140, which is set in the FCH 754 (FIG. 7). The FCH 754 has space to describe up to 4 following DL bursts, one of which is used to describe DL burst1 756 and the other fields may be used for describing the number of MSes. The MS knows the time offset of each UL burst by dividing the whole UL burst portion into the number of MSes; (2) the basic CID which is included in the simplified IRNG-RSP (Initial Ranging Response) message sent by SMS. If the Basic CID of the MS is 1, it may use the first UL burst for transmission.

The process 830 may omit an UCD message by including modulation information in a FCH (Block 836). A UCD message includes UL burst profile which is used for notifying the modulation type of each UL burst and some channel information. The SMS may include the modulation types of each or whole UL burst in the FCH 754 (FIG. 7) so that the SMS does not need to broadcast UCD messages.

The process 830 may simplify a DCD message by excluding DL burst profile, frame duration code, transmit/receive transition gap (TTG), and receive/transmit transition gap (RTG) (Block 838). A DCD message includes DL burst profile which is used for notifying the modulation type of each DL burst and some channel information. The SMS may exclude DL burst profile because the modulation type of DL burst is described in the FCH 754 (FIG. 7). The SMS may exclude the frame duration code, the TTG 715, the RTG 740 because these values may be set as default values in the ad-hoc mode. The SMS may also exclude all other fields to simplify DCD message but may include the 'SMS name' field which is not defined in the IEEE 802.16 standards. The SMS name may be used for the MS to display the list of scanned SMS for user's convenience. The process 820 is then terminated.

FIG. 8D is a flowchart illustrating the process 840 shown in FIG. 8A to simplify network entry according to one embodiment of the invention. During the initialization process, there are many stages according to the IEEE 802.16 standards. The BS makes a decision and builds a response message and transmits it for each request. These tasks are not needed in ad-hoc mode communication and therefore may be simplified.

Upon START, the process 840 may perform at least one of the operations or actions in blocks 841, 842, 843, 844, 845, 846, and 847. These operations simplify the network entry procedures for ad-hoc mode communication.

The process 840 may use fixed default values of frame duration and cyclic prefix (CP) index (Block 841). By using fixed default values, an MS may significantly reduce the number of trial combinations during the search or scanning phase.

The process 840 may exclude power, timing, and frequency offset information in an initial ranging response message (Block 842). As described earlier, these data may be excluded in the IRNG message although the basic CID may be included to identify a MS in the ad-hoc network 140 (FIG. 1).

The process 840 may include a basic connection identification (CID) to identify a MS in the ad-hoc network (Block 843). The IRNG may include a MS name which may be set by the user. The MS name is not defined in the IEEE 802.16 standard. It may be used for the SMS to display a list of communicating MSes for user's convenience.

The process 840 may skip basic capability negotiation by using fixed default values of automatic repeat request (ARQ) mode, fragmentation mode, and packing mode (Block 844).

The process 840 may skip subscriber station (SS) authorization and registration (Block 845). The SMS and all MSes in the ad-hoc network 140 (FIG. 1) may not use private key management (PKM) protocol. The payload encryption key and encryption algorithm may be set by the user manually or the payload may not be encrypted unless the user turns on the payload encryption mode.

The process 840 may skip an optional process as defined in the broadband wireless standard (Block 846). The optional process includes at least one of establishing Internet Protocol (IP) connectivity, establishing time of day, and transferring operational parameters. The SMS and the MSes in the ad-hoc network may use a manually user set IP address or an automatically generated static IP address in which the least significant byte of the IP address may be derived from the Basic CID.

The process 840 may establish a single connection numbered by basic CID (Block 847). Under the IEEE 802.16 standards, a MS has multiple logical connections to provide Quality of Service (QoS) which is described by many parameters and is used for the BS to schedule the network traffic. These may not be needed in an ad-hoc network. A MS operating on the ad-hoc mode may use only one connection. This single connection may be numbered by Basic CID. This connection may transmit and receive all types of data streams as well as management messages.

The process 840 may perform one or more simplifications described above. The process 840 is then terminated.

FIG. 8E is a flowchart illustrating the process 850 shown in FIG. 8A to simplify bandwidth allocation and scheduling according to one embodiment of the invention.

Upon START, the process 850 sets the scheduling type of connection to unsolicited grant service (UGS) by default (Block 852). The IEEE 802.16 standards define a few types of scheduling method such as unsolicited grant service (UGS), real-time polling service (rtPS), non-Real-time polling service (nrtPS), best efforts (BE), etc. The BS refers to the type of each connection to allocate UL subframe. In addition, the BS receives bandwidth request messages from the MSes, extracts requested amount, and decides how much bandwidth to be allocated to the connection by referring to the transmission history and the QoS parameters of the requested connection. These operations may not be needed in the ad-hoc mode communication. In the Ad-hoc network, the SMS and MSes may use only one basic connection as described above. The scheduling type of the connection may be set to UGS by default. The process 850 is then terminated.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations described above. The term "information" or "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
configuring an ad-hoc mode for a first mobile station (MS) operating in an ad-hoc network under a broadband wireless standard, wherein configuring comprises configuring ad-hoc parameters including an operational mode, the operational mode being one of a MS mode, a serving MS (SMS) mode, and an automatic mode;
acquiring an ad-hoc mode communication having a simplified communication protocol of the broadband wireless standard, wherein acquiring comprises:
if the operational mode is the automatic mode,
automatically searching for a serving MS,
if no serving MS is found during a search period,
setting the first MS to be the serving MS, if at least one serving MS is found during the search period, allowing a user to select the serving MS; and communicating with a second MS using the ad-hoc mode communication.

2. The method of claim 1 wherein configuring comprises:
configuring ad-hoc mode parameters including at least one of a MS name, an encryption key, and a frequency channel.

3. A method comprising:
configuring an ad-hoc mode for a first mobile station (MS) operating in an ad-hoc network under a broadband wireless standard;
acquiring an ad-hoc mode communication having a simplified communication protocol of the broadband wireless standard; and
communicating with a second MS using the ad-hoc mode communication;
wherein configuring comprises configuring ad-hoc mode parameters including at least one of a MS name, an operational mode, an encryption key, and a frequency channel, the operational mode being one of a MS mode, a serving MS (SMS) mode, and an automatic mode; and
wherein acquiring comprises:
if the operational mode is the automatic mode or the MS mode,
searching for SMS during a search period,
if at least an SMS is found,
displaying the at least found SMS,
allowing user to select an SMS to connect to, and
starting the ad-hoc mode communication with the selected SMS;
else if the operational mode is the automatic mode,
setting the operational mode as the SMS mode
searching for an available frequency channel, and
starting the ad-hoc mode communication as an ad-hoc SMS; and if the operational mode is the SMS mode,
searching for an available frequency channel, and
starting the ad-hoc mode communication as an ad-hoc SMS.

4. The method of claim 2 wherein communicating with the second MS comprises at least one of:
simplifying initial ranging and periodic ranging;
simplifying broadcast management messages;
simplifying network entry; and
simplifying bandwidth allocation and scheduling.

5. A method comprising:
configuring an ad-hoc mode for a first mobile station (MS) operating in an ad-hoc network under a broadband wireless standard;
acquiring an ad-hoc mode communication having a simplified communication protocol of the broadband wireless standard; and
communicating with a second MS using the ad-hoc mode communication;
wherein configuring comprises configuring ad-hoc mode parameters including at least one of a MS name, an operational mode, an encryption key, and a frequency channel, the operational mode being one of a MS mode, a serving MS (SMS) mode, and an automatic mode;
wherein communicating with the second MS comprises at least one of:
simplifying initial ranging and periodic ranging;
simplifying broadcast management messages;
simplifying network entry; and
simplifying bandwidth allocation and scheduling; and wherein simplifying initial ranging and periodic ranging comprises at least one of:
allocating uplink (UL) burst interval sufficiently long to prevent collision between UL physical layer (PHY) protocol data unit (PDU) messages; and
pre-pending a long preamble on an UL PHY PDU message to facilitate detecting and decoding the UL PHY PDU by an SMS.

6. The method of claim 4 wherein simplifying broadcast management messages comprises at least one of:
omitting downlink (DL) medium access protocol (MAP) messages by packing DL medium access control (MAC) protocol data unit (PDU) messages into a single DL burst;
omitting uplink (UL) MAP messages by calculating time offset of an UL burst using number of MSes in the ad-hoc network and a basic connection identification (CID);
omitting an uplink channel descriptor (UCD) message by including modulation information in a frame control header (FCH); and
simplifying a downlink channel descriptor (DCD) message by excluding DL burst profile, frame duration code, transmit/receive transition gap (TTG), and receive/transmit transition gap (RTG).

7. The method of claim 4 wherein simplifying network entry comprises at least one of:
using fixed default values of frame duration and cyclic prefix (CP) index;
excluding power, timing, and frequency offset information in an initial ranging response message;
including basic connection identification (CID) to identify a MS in the ad-hoc network;
skipping basic capability negotiation by using fixed default values of automatic repeat request (ARQ) mode, fragmentation mode, and packing mode;
skipping SS authorization and registration;
skipping an optional process as defined in the broadband wireless standard, the optional process including at least one of establishing Internet Protocol (IP) connectivity, establishing time of day, and transferring operational parameters; and
establishing a single connection numbered by basic CID.

8. The method of claim 4 wherein simplifying bandwidth allocation and scheduling comprises at least one of:
setting scheduling type of connection to unsolicited grant service (UGS) by default.

9. The method of claim 1 wherein the broadband wireless standard is an Institute of Electronic and Electrical Engineers (IEEE) 802.16 standard.

10. An apparatus comprising:
a configuration module to configure an ad-hoc mode for a first mobile station (MS) operating in an ad-hoc network under a broadband wireless standard, wherein the configuration module configures ad-hoc parameters including an operational mode, the operational mode being one of a MS mode, a serving MS (SMS) mode, and an automatic mode;
an acquisition module coupled to the configuration module to acquire an ad-hoc mode communication having a simplified communication protocol of the broadband wireless standard, wherein the acquisition module performs operations comprising:
if the operational mode is the automatic mode, automatically searching for a serving MS,
if no serving MS is found during a search period, setting the first MS to be the serving MS, if at least one serving MS is found during the search period, allowing a user to select the serving MS; and a communication module coupled to the acquisition module to communicate with a second MS using the ad-hoc mode communication.

11. The apparatus of claim 10 wherein the configuration module configures ad-hoc mode parameters including at least one of a MS name, an encryption key, and a frequency channel.

12. An apparatus comprising:
a configuration module to configure an ad-hoc mode for a first mobile station (MS) operating in an ad-hoc network under a broadband wireless standard;
an acquisition module coupled to the configuration module to acquire an ad-hoc mode communication having a simplified communication protocol of the broadband wireless standard; and
a communication module coupled to the acquisition module to communicate with a second MS using the ad-hoc mode communication;
wherein the configuration module configures ad-hoc mode parameters including at least one of a MS name, an operational mode, an encryption key, and a frequency channel, the operational mode being one of a MS mode, a serving MS (SMS) mode, and an automatic mode; and
wherein the acquisition module performs operations comprising:
if the operational mode is the automatic mode or the MS mode,
searching for SMS during a search period,
if at least an SMS is found,
displaying the at least found SMS,
allowing user to select an SMS to connect to, and
starting the ad-hoc mode communication with the selected SMS;
else if the operational mode is the automatic mode,
setting the operational mode as the SMS mode
searching for an available frequency channel, and
starting the ad-hoc mode communication as an ad-hoc SMS; and
if the operational mode is the SMS mode,
searching for an available frequency channel, and
starting the ad-hoc mode communication as an ad-hoc SMS.

13. The apparatus of claim 11 wherein the communication module communicates with the second MS by performing at least one of:
simplifying initial ranging and periodic ranging;
simplifying broadcast management messages;
simplifying network entry; and
simplifying bandwidth allocation and scheduling.

14. An apparatus comprising:
a configuration module to configure an ad-hoc mode for a first mobile station (MS) operating in an ad-hoc network under a broadband wireless standard;
an acquisition module coupled to the configuration module to acquire an ad-hoc mode communication having a simplified communication protocol of the broadband wireless standard; and
a communication module coupled to the acquisition module to communicate with a second MS using the ad-hoc mode communication;
wherein the configuration module configures ad-hoc mode parameters including at least one of a MS name, an operational mode, an encryption key, and a frequency channel, the operational mode being one of a MS mode, a serving MS (SMS) mode, and an automatic mode;
wherein the communication module communicates with the second MS by performing at least one of:
simplifying initial ranging and periodic ranging;
simplifying broadcast management messages;
simplifying network entry; and
simplifying bandwidth allocation and scheduling; and
wherein the communication module performs simplifying initial ranging and periodic ranging by performing at least one of:
allocating uplink (UL) burst interval sufficiently long to prevent collision between UL physical layer (PHY) protocol data unit (PDU) messages; and
pre-pending a long preamble on an UL PHY PDU message to facilitate detecting and decoding the UL PHY PDU by an SMS.

15. The apparatus of claim 13 wherein the communication module performs simplifying broadcast management messages by performing at least one of:
omitting downlink (DL) medium access protocol (MAP) messages by packing DL medium access control (MAC) protocol data unit (PDU) messages into a single DL burst;
omitting uplink (UL) MAP messages by calculating time offset of an UL burst using number of MSes in the ad-hoc network and a basic connection identification (CID);
omitting an uplink channel descriptor (UCD) message by including modulation information in a frame control header (FCH); and
simplifying a downlink channel descriptor (DCD) message by excluding DL burst profile, frame duration code, transmit/receive transition gap (TTG), and receive/transmit transition gap (RTG).

16. The apparatus of claim 13 wherein the communication module performs simplifying network retry by performing at least one of:
using fixed default values of frame duration and cyclic prefix (CP) index;
excluding power, timing, and frequency offset information in an initial ranging response message;
including basic connection identification (CID) to identify a MS in the ad-hoc network;
skipping basic capability negotiation by using fixed default values of automatic repeat request (ARQ) mode, fragmentation mode, and packing mode;
skipping SS authorization and registration;
skipping an optional process as defined in the broadband wireless standard, the optional process including at least one of establishing Internet Protocol (IP) connectivity, establishing time of day, and transferring operational parameters; and
establishing a single connection numbered by basic CID.

17. The apparatus of claim 13 wherein the communication module performs simplifying bandwidth allocation and scheduling by performing at least one of:
setting scheduling type of connection to unsolicited grant service (UGS) by default.

18. The apparatus of claim 10 wherein the broadband wireless standard is an Institute of Electronic and Electrical Engineers (IEEE) 802.16 standard.

19. A system comprising:
an antenna;
an radio frequency (RF) transceiver coupled to the antenna to transmit and receive RF signals in an ad-hoc network;

a physical layer processor (PHY) coupled to the RF transceiver to process the RF signals; and an ad-hoc communication processing unit coupled to the PHY to perform ad-hoc mode communication with another mobile station (MS) the ad-hoc communication processing unit comprising:
- a configuration module to configure an ad-hoc mode for a first mobile station (MS) operating in an ad-hoc network under a broadband wireless standard, wherein the configuration module configures ad-hoc parameters including an operational mode, the operational mode being one of a MS mode, a serving MS (SMS) mode, and an automatic mode;
- an acquisition module coupled to the configuration module to acquire an ad-hoc mode communication having a simplified communication protocol of the broadband wireless standard, wherein the acquisition module performs operations comprising:
  - if the operational mode is the automatic mode, automatically searching for a serving MS,
    - if no serving MS is found during a search period, setting the first MS to be the serving MS,
    - if at least one serving MS is found during the search period, allowing a user to select the serving MS; and
- a communication module coupled to the acquisition module to communicate with the other MS using the ad-hoc mode communication.

20. The system of claim 19 wherein the configuration module configures ad-hoc mode parameters including at least one of a MS name, an encryption key, and a frequency channel.

21. A system comprising:
an antenna;
an radio frequency (RF) transceiver coupled to the antenna to transmit and receive RF signals in an ad-hoc network;
a physical layer processor (PHY) coupled to the RF transceiver to process the RF signals; and
an ad-hoc communication processing unit coupled to the PHY to perform ad-hoc mode communication with another mobile station (MS), the ad-hoc communication processing unit comprising:
- a configuration module to configure an ad-hoc mode for a first mobile station (MS) operating in an ad-hoc network under a broadband wireless standard,
- an acquisition module coupled to the configuration module to acquire an ad-hoc mode communication having a simplified communication protocol of the broadband wireless standard, and
- a communication module coupled to the acquisition module to communicate with the other MS using the ad-hoc mode communication;
wherein the configuration module configures ad-hoc mode parameters including at least one of a MS name, an operational mode, an encryption key, and a frequency channel, the operational mode being one of a MS mode, a serving MS (SMS) mode, and an automatic mode; and
wherein the acquisition module performs operations comprising:
if the operational mode is the automatic mode or the MS mode,
  searching for SMS during a search period,
  if at least an SMS is found,
    displaying the at least found SMS,
    allowing user to select an SMS to connect to, and
    starting the ad-hoc mode communication with the selected SMS;
  else if the operational mode is the automatic mode,
    setting the operational mode as the SMS mode
    searching for an available frequency channel, and
    starting the ad-hoc mode communication as an ad-hoc SMS; and
if the operational mode is the SMS mode,
  searching for an available frequency channel, and
  starting the ad-hoc mode communication as an ad-hoc SMS.

22. The system of claim 20 wherein the communication module communicates with the other MS by performing at least one of:
simplifying initial ranging and periodic ranging;
simplifying broadcast management messages;
simplifying network entry; and
simplifying bandwidth allocation and scheduling.

23. The system of claim 19 wherein the broadband wireless standard is an Institute of Electronic and Electrical Engineers (IEEE) 802.16 standard.

24. An article of manufacture comprising:
a non-transitory machine-accessible storage medium including information that, when accessed by a machine, cause the machine to perform operations comprising:
  configuring an ad-hoc mode for a first mobile station (MS) operating in an ad-hoc network under a broadband wireless standard, wherein configuring comprises configuring ad-hoc parameters including an operational mode, the operational mode being one of a MS mode, a serving MS (SMS) mode, and an automatic mode;
  acquiring an ad-hoc mode communication having a simplified communication protocol of the broadband wireless standard, wherein acquiring comprises:
    if the operational mode is the automatic mode,
      automatically searching for a serving MS,
        if no serving MS is found during a search period, setting the first MS to be the serving MS,
        if at least one serving MS is found during the search period, allowing a user to select the serving MS; and
  communicating with a second MS using the ad-hoc mode communication.

25. The article of manufacture of claim 24 wherein the information causing the machine to perform configuring comprises information that, when accessed by a machine, cause the machine to perform operations comprising:
configuring ad-hoc mode parameters including at least one of a MS name, an encryption key, and a frequency channel.

26. An article of manufacture comprising:
a non-transitory machine-accessible storage medium including information that, when accessed by a machine, cause the machine to perform operations comprising:
configuring an ad-hoc mode for a first mobile station (MS) operating in an ad-hoc network under a broadband wireless standard;
acquiring an ad-hoc mode communication having a simplified communication protocol of the broadband wireless standard; and
communicating with a second MS using the ad-hoc mode communication;
wherein the information causing the machine to perform configuring comprises information that, when accessed by a machine, cause the machine to perform operations comprising:

configuring ad-hoc mode parameters including at least one of a MS name, an operational mode, an encryption key, and a frequency channel, the operational mode being one of a MS mode, a serving MS (SMS) mode, and an automatic mode; and wherein the information causing the machine to perform acquiring comprises information that, when accessed by a machine, cause the machine to perform operations comprising:

if the operational mode is the automatic mode or the MS mode,
    searching for SMS during a search period,
    if at least an SMS is found,
        displaying the at least found SMS,
        allowing user to select an SMS to connect to, and
        starting the ad-hoc mode communication with the selected SMS;

else if the operational mode is the automatic mode,
        setting the operational mode as the SMS mode
        searching for an available frequency channel, and
        starting the ad-hoc mode communication as an ad-hoc SMS; and
    if the operational mode is the SMS mode,
        searching for an available frequency channel, and
        starting the ad-hoc mode communication as an ad-hoc SMS.

27. The article of manufacture of claim 25 wherein the information causing the machine to perform communicating with the second MS comprises information that, when accessed by a machine, cause the machine to perform at least one of operations comprising:
    simplifying initial ranging and periodic ranging;
    simplifying broadcast management messages;
    simplifying network entry; and
    simplifying bandwidth allocation and scheduling.

\* \* \* \* \*